(12) United States Patent
Carmody et al.

(10) Patent No.: US 10,127,614 B1
(45) Date of Patent: Nov. 13, 2018

(54) INVESTMENT EVALUATOR

(71) Applicant: Millennium Investment and Retirement Advisors LLC, Charlotte, NC (US)

(72) Inventors: Bert M. Carmody, Atlanta, GA (US); Ricky Gene Canipe, Siler City, NC (US); James Matthew Holland, Charlotte, NC (US); William Roger Branch, Waxhaw, NC (US)

(*) Notice: Subject to any disclaimer, the term of this patent is extended or adjusted under 35 U.S.C. 154(b) by 0 days.

(21) Appl. No.: 15/662,149

(22) Filed: Jul. 27, 2017

Related U.S. Application Data

(60) Provisional application No. 62/368,060, filed on Jul. 28, 2016, provisional application No. 62/375,357, filed on Aug. 15, 2016.

(51) Int. Cl.
*G06Q 40/06* (2012.01)
*G06Q 40/00* (2012.01)

(52) U.S. Cl.
CPC .......... *G06Q 40/06* (2013.01); *G06Q 40/10* (2013.01)

(58) Field of Classification Search
CPC ......... G06Q 40/06; G06Q 40/00; G06Q 40/02
See application file for complete search history.

(56) References Cited

U.S. PATENT DOCUMENTS

| | | | | |
|---|---|---|---|---|
| 7,707,092 B1* | 4/2010 | Freed | ............ | G06Q 40/06 705/36 R |
| 7,970,684 B1* | 6/2011 | Benda | ............ | G06Q 40/06 705/36 R |
| 2006/0253356 A1* | 11/2006 | Charles | ............ | G06Q 40/00 705/35 |
| 2008/0033886 A1* | 2/2008 | Witz | ............ | G06Q 40/02 705/36 R |
| 2009/0198633 A1* | 8/2009 | Howard | ............ | G06Q 10/10 705/36 R |
| 2009/0292563 A1* | 11/2009 | Michalowski | ........ | G06Q 40/06 705/4 |
| 2012/0116992 A1* | 5/2012 | Tuchman | ............ | G06Q 40/06 705/36 R |
| 2012/0296845 A1* | 11/2012 | Andrews | ............ | G06Q 40/06 705/36 R |
| 2014/0012777 A1* | 1/2014 | Freeman | ............ | G06Q 40/06 705/36 R |
| 2015/0095264 A1* | 4/2015 | Williams | ............ | G06Q 40/06 705/36 R |
| 2015/0242794 A1* | 8/2015 | Ehrhart | ............ | G06Q 10/06398 705/7.42 |

FOREIGN PATENT DOCUMENTS

WO    WO-2010104545 A2 *  9/2010  ............ G06Q 40/06

OTHER PUBLICATIONS

Zhang et al.: Is There a Case for Actively Manged Funds? Mar. 1, 2015, The Wall Street Journal, pp. 1-5. (Year: 2015).*

(Continued)

*Primary Examiner* — Bijendra K Shrestha

(57) ABSTRACT

A system, method and software are disclosed for evaluating investments. In one example, managed trust investments are analyzed with respect to one or more indexes. An indication is created of how the managed investment compares to the one or more indexes or their own benchmarks, and suggested changes to the managed investment may be presented.

22 Claims, 4 Drawing Sheets

(56) References Cited

OTHER PUBLICATIONS

Haslem et al.: Performanceand characteristics of actively managed retail equity mutual funds with diverse expense ratio, 2008, Financial Services Review, 17, pp. 49-68. (Year: 2008).*
Max, S.: Should Fund Managers Get Paid for Performance? Feb. 13, 2016, Barron's pp. 1-3 (Year: 2016).*
Vine, John M.: Prudent Investing, 2010, Tax Management Compensation Planning Journal, vol. 38, No. 1, pp. 1-34. (Year: 2010).*
Bello et al.: A Re-Examination of the Impact of Expenses on the Performance of Actively Managed Equity Mutual Funds, 2010, European Journal of Finance and Banking Research, vol. 3, No. 3, pp. 39-50. (Year: 2010).*

* cited by examiner

INVESTMENT EVALUATOR

CROSS REFERENCE TO RELATED APPLICATIONS

This application claims priority to, and benefit from, provisional patent application Ser. No. 62/368,060, entitled "INVESTMENT EVALUATOR", filed Jul. 28, 2016, and Ser. No. 62/375,357, entitled "INVESTMENT EVALUATOR", filed Aug. 15, 2016, which are incorporated by reference for all purposes.

BACKGROUND

Many companies have employees' funds in 401k, 403b and IRA accounts. Typically, there is a person or persons whose job it is to manage the funds; those person(s) (trustees) bear the "highest duty known to the law." Given the U.S. Supreme Court's (SCOTUS) recent unanimous May 18, 2015 ruling: "Under trust law, a trustee has a continuing duty to monitor trust investments and remove imprudent ones." Also useful to note are their words: "Rather, the trustee must "systematic[ally] consider[r] all the investments of the trust at regular intervals" to ensure that they are appropriate."

This creates a rather large liability for companies and trustees of lawsuits and federal government (e.g., U.S. Department of Labor (DOL), Internal Revenue Service (IRS) enforcement for mismanagement of the retirement plan investments). Furthermore, with better management, the investments may perform better and grow faster which enhances retirement security for millions of American workers.

Qualified retirement plans such as: 401(k), 403(b), profit sharing plans and others are facing two new challenges: 1) the 2015 9-0 Supreme Court ruling that requires plan fiduciaries to monitor their investment portfolios forever (no statute of limitations as had previously been understood) and; 2) a recent U.S. Department of Labor revised and expanded definition of the term fiduciary. The combination of the SCOTUS ruling and DOL definition revision has significantly changed the retirement plan landscape and its importance is emphasized to the client companies and their fiduciaries.

The qualified retirement plan (401(k)/403(b)) is the only retirement savings many participants have and those who are charged with offering them have always had a duty to put the sole interest of the participants and their beneficiaries first:

Every aspect of the plan (administrative & investments) must have the participant in mind. As fiduciaries, you must ensure that all fees are reasonable and all the providers who service the plan (recordkeepers, investment advisors, paying agents, accountants, etc.) are necessary for its operation.

The plan must always be in compliance with the IRS tax code and the Employee Retirement Income Security Act of 1974 (ERISA).

Much of the background of ERISA comes from trust law that has evolved over the years. In fact, when an ERISA case is filed, it is common to cite trust law as the basis to support ERISA statutes. Example: Under trust law, a trustee has a continuing duty to monitor trust investments and remove imprudent ones. This continuing duty exists separate and apart from the trustee's duty to exercise prudence in selecting investments at the outset. [Justice Breyer from the Tibble case]

The Supreme Court decision (Tibble v Consolidated Edison No. 13-550 May 18, 2015) ruled that plan fiduciaries' duty to monitor all plan investments is infinite. If an investment consistently underperforms the criteria laid out in the written guidance or Investment Policy Statement (IPS), the fiduciaries must take steps to replace them. From the Court: A fiduciary must discharge his responsibilities "with the care, skill, prudence, and diligence" that a prudent person "acting in a like capacity and familiar with such matters" would use.

The second is the Department of Labor's revised definition of the term fiduciary. On Apr. 6, 2016, the U.S. Department of Labor released the final rule under ERISA. The Rule is the culmination of six years of effort by the DOL to significantly broaden the definition of "fiduciary" advice to ERISA plans and extend it to include advice on individual accounts including IRAs. Essentially, if anyone gives investment advice to a 401(k)/403(b) plan or IRA account, they are acting as a fiduciary subject to all the regulations, liability and responsibility involved. While brokers and advisors have two years to be fully compliant with the changes, the Responsible Plan Fiduciary (RPF) has no grace period; they need to be compliant now.

SUMMARY

The systems, methods, and software according to the present disclosure overcome the drawbacks of known investments and trusts by providing tools for monitoring investments, creating comparison information, and providing suggestions for improving the management of investments.

Embodiments, examples, features, aspects, and advantages of the present disclosure will become better understood with regard to the following description, appended claims and accompanying drawings.

BRIEF DESCRIPTION OF THE DRAWINGS

The foregoing and attendant aspects of the present disclosure will become more readily appreciated by reference to the following detailed description, when taken in conjunction with the accompanying drawings, wherein.

Figure 1:
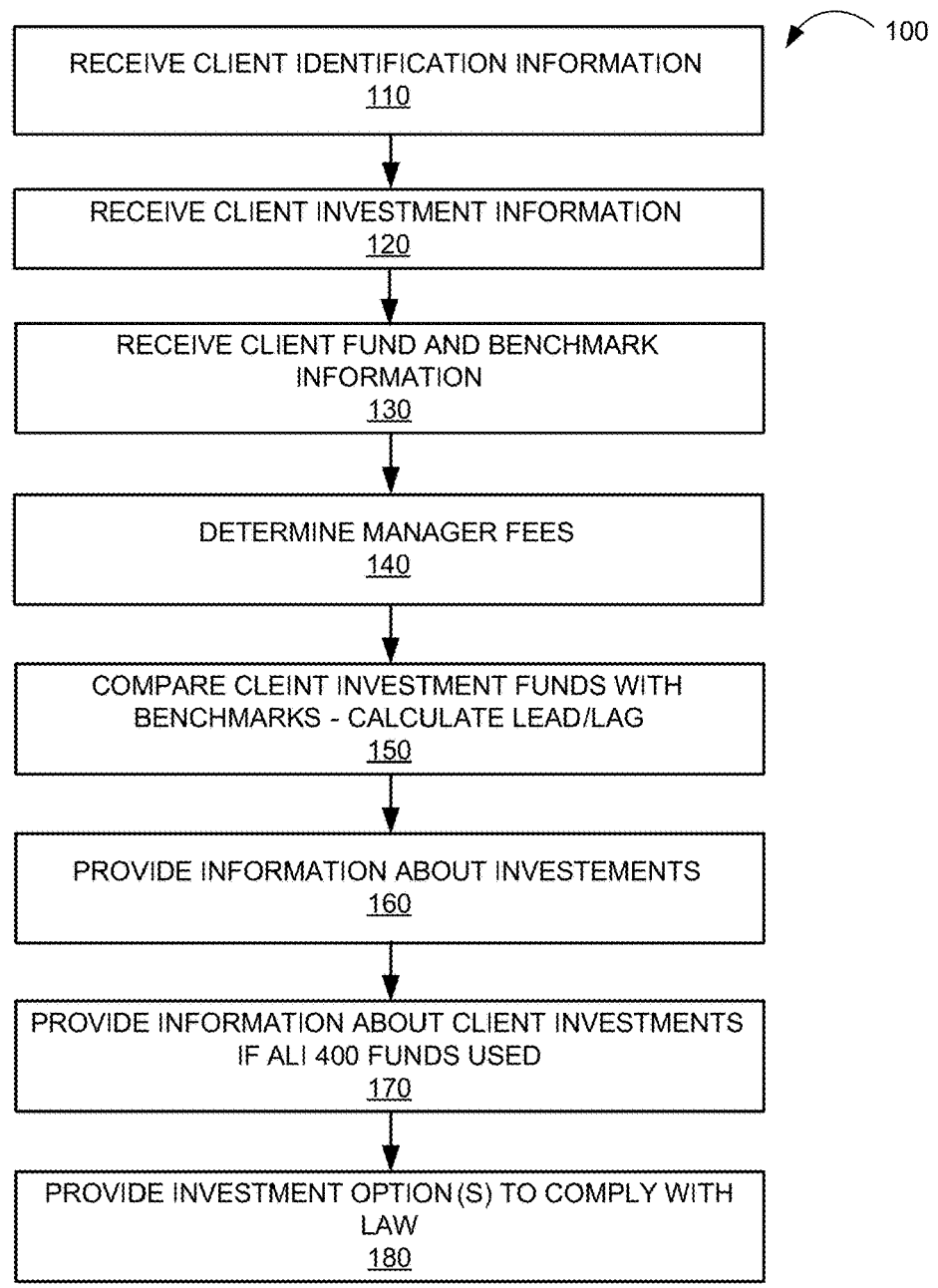
FIG. 1 is a diagram illustrating an example method.

Reference symbols or names are used in the Figures to indicate certain components, aspects or features shown therein. Reference symbols common to more than one Figure indicate like components, aspects or features shown therein.

DETAILED DESCRIPTION

In accordance with embodiments described herein are systems, methods, and software disclosed herein coupled with this new and useful analytical tool for assisting primarily those persons (trustees) bearing the "highest duty known to the law." Given the U.S. Supreme Court's (SCOTUS) recent unanimous May 18, 2015 ruling: "Under trust law, a trustee has a continuing duty to monitor trust investments and remove imprudent ones." Also useful to note are their words: "Rather, the trustee must "systematic[ally] consider[r] all the investments of the trust at regular intervals" to ensure that they are appropriate." https://www.law.cornell.edu/supremecourt/text/13-550

An example method can be used to comply with this SCOTUS ruling, but it also can be used to avoid excise taxes under the Internal Revenue Code Section 4975.

It is also extremely useful for trustees (who are most often CEOs, CFOs, HR Directors and small business owners) in complying with the new ERISA's rules regarding using trust assets to pay providers (https://www.law.cornell.edu/cfr/text/29/2550.408b-2).

Additionally, it is quite useful in helping to remove labor burdens from trustees' efforts to comply with the new ERISA rules requiring trustees to annually issue reports of how the trust assets performed v. benchmarks to beneficiaries. https://www.law.cornell.edu/cfr/text/29/2550.404a-5

Lastly, this can uncover a lack of knowledge or value and identify in less than 30 minutes any trust losses which is useful to avoid violations of ERISA's "prudent expert rule" and associated U.S. Department of Labor's 20% excise taxes for breach of fiduciary duties.

Fortunately, to maintain "ERISA compliant plans" ERISA permits fiduciaries, and in fact business insurers require them, to seek help from useful tools like this when they are NOT experienced enough to be considered compliant with the "prudent expert rule."

Systems, methods and software disclosed herein may produce concrete, useful and tangible results that can help these parties protect trusts from losses and help secure a higher retirement account balance for all employees and beneficiaries of trusts (401k, 403b, foundations, endowments, IRAs, etc.). For example, because index funds do not pay commissions or fees, brokers are financially motivated to offer higher cost, often poorer performing actively managed funds to the detriment of plan participants. Disclosed herein demonstrates how imprudent funds are quickly identified.

One deficiency addressed by the contents of this disclosure is the common practice of evaluating investments relative to peers rather than their index benchmarks. While widespread, it may be that this practice is imprudent and goes against both the letter and the spirit of trust law and ERISA. The precedent of using benchmarks for comparison is clearly established not only in the courts and DOL, but also in the IPS and the mutual fund prospectuses themselves. Trust law (and by direct inference ERISA) is not forgiving in this practice. From § 90 Restatement of the Third Law of Trusts 2007 pages 385:

What are the implications for investment fiduciaries? Certainly, one important implication is that fiduciaries are well advised to pay particular attention to investment expenses. A recent SEC report emphasizes that trading expenses are "anti-performance" and that excessive investment charges can be onerous to future wealth accumulation: "seeming small changes in expenses can have a large impact on the amount of money accumulated for a long-term goal."

" . . . Active investment management entails greater portfolio expenses, research costs, and operational fees than in passive investment management (e.g. index funds) . . . in exchange for an uncertain chance of market-beating performance. Most actively managed [funds] failed to earn market returns net of their cost . . . Fiduciaries can capture market returns at low cost by buying index funds. Therefore, the fiduciary deciding to employ active management should document why he reasonably expects the extra costs of active management can be justified."

System, methods, and software disclosed herein may provide for an analysis tool that identifies investment performance and compares it to index-based benchmarks (consistent with the trust law cited above). This tool calculates the current year loss against index-based benchmarks, the lagging funds' average returns versus the benchmarks, how percent of investments that lag their benchmarks, how much money is in those lagging funds and a five year return look back—the summation of which can be used to estimate the potential exposure to fiduciaries and their firms from claims and governmental enforcement actions.

Although fiduciaries have always had to assess providers' payments to ensure necessity and reasonableness, after Jul. 1, 2012 the U.S. Department of Labor (DOL) required annual delivery of documents from providers to fiduciaries and plan participants. These disclosures bring 401k/403b service provider and mutual fund costs to light and greatly help fiduciaries assess those fees to help ensure both "earn their keep", thus avoiding unjustified costs that violate exemptions under ERISA Section 408b2. Fiduciaries also became burdened by and responsible for development and delivery of ERISA Section 404a-5 compliant "performance vs. benchmarks" annual notices after Jul. 1, 2012. If fiduciaries do not ensure compliance, they themselves can be cited for "fiduciary breaches" and be personally liable for the U.S. Dept. of Labor's 20% excise tax and the Internal Revenue Services' 15% tax for every year their breach(es) are uncovered. ERISA's and the IRS' rules pierce the proverbial corporate veil that normally protects C-corporation owners and executives. Also, insurance coverage now requires trustees and CEOs to state that their 401k/403b was operated in a compliant fashion or coverage could be abated and the premiums paid may have been wasted.

Pursuant to ERISA section 404(a)(1), 29 U.S.C. 1104(a)(1), fiduciaries must discharge their duties with respect to the plan solely in the interest of the participants and beneficiaries. Section 404(a)(1)(A), 29 U.S.C. 1104(a)(1)(A), states that the fiduciary must act for the exclusive purpose of providing benefits to the participants and beneficiaries and defraying reasonable plan administration expenses. In addition, section 404(a)(1)(B), 29 U.S.C. 1104(a)(1)(B), requires a fiduciary to act with the care, skill, prudence and diligence under the prevailing circumstances that a prudent person acting in a like capacity and familiar with such matters would use. The "familiar with such matters" language has been interpreted to mean "expert". This language creates an important distinction from the earlier prudent person guideline, in that it holds fiduciaries to a stricter standard. No matter when a fund goes into a 401k/403b the fiduciaries must systematically and regularly monitor it. Under trust law, a trustee has a continuing duty to monitor trust investments and remove imprudent ones. This continuing duty exists separate and apart from the trustee's duty to exercise prudence in selecting investments at the outset. Fiduciaries satisfy their duties by being attentive and active and should they lack the requisite knowledge they would need to obtain the advice of a qualified, independent expert or engage in an independent investigation of the plans' investments. Failure to implement adequate monitoring and reviewing procedures may subject fiduciaries to personal liability for a breach of their fiduciary duty. Beneficiaries subject to higher fees for materially identical funds lose not only the money spent on higher fees, but also "lost investment opportunity"; that is, the money that the portion of their investment spent on unnecessary fees would have earned over time.

The average mutual fund loses 1% in growth to manager costs and the average manager sells 83% of the underlying holdings every year which creates 1% in transaction costs meaning 2% total of the expected 6% average return is lost due to these expenses. Lack of growth impacts terminal wealth at retirement much more than the savings rate.

FIG. 1 shows an example method 100, according to an embodiment. Method 100 includes receiving client identification information, which may include the Employer Identification Number (EIN) 110. Every retirement plan must be approved for tax exempt status, which is accomplished by the sponsoring company filing a Determination Letter request to the Internal Revenue Service (IRS) under their employer number (EIN). All plans' Annual Reports (Forms 5500) are certified and electronically transmitted to the U.S. Labor Dept. and shared with the IRS and maintained publicly at www.efast.dol.gov. Every plan with over 100 eligible employees must have an independent audit performed to verify the plan's income statement and balance sheet financials. Typically, this information is received from the client and entered into the system. This information may also be automatically received based at least on the name of the client company.

Method 100 may also include receiving client investment information 120. The client investment information may be based at least in part on the client's information, such as EIN. The client investment information may include the Annual Report, income statement, balance sheet, and schedule of assets for the client's 401k/403b investments. This information may also include the funds or other investment options and the investments benchmarks, within the client's investments.

Also received are the cash flows for the client's investments, which include the amount of money added to the investments, as well as money going out of the investments due to employees leaving the plan among other reasons. This information may be received for the past six (6) years, which is the statute of limitations for fiduciary mismanagement.

The systems and methods of the present disclosure use the plan's most recent Annual Report which is due no later than October 15$^{th}$ of each year, for each calendar year plan. For example, most plans' reports online are for the 2015 plan year filed last October 2016. The auditors' Dec. 31, 2015 balance sheet listing each funds' name and invested dollars are used to establish the Jan. 1, 2016 balance for analysis.

The systems and methods of the present disclosure use the plan's 2015, 2014, 2013, 2012 income statements to establish net flows from contributions into the plan and distributions out of the plan. So the denominator of each calculation uses the weighting of 50% for money in and money out since the flows are consistent all during the plan year. This Dietz method of determining a basis is consistent with the Global Investment Performance Standards requirements for time weighting and cash flow impact on investments. Peter O. Dietz published his seminal work, Pension Funds: Measuring Investment Performance, in 1966. The Bank Administration Institute (BAI), a U.S.-based organization serving the financial services industry, subsequently formulated rate-of-return calculation guidelines based on Dietz's work.

There are over 30,000 funds currently in the marketplace. The method 100 includes receiving information about the client funds and benchmarks 130. This may take a person hundreds of hours to find this information and perform the necessary computations.

Once this information is received, the manager or broker fees can be determined by finding the difference of the amount in the investment, and the amount that should be in the investment based on performance, or these amounts may be available from publicly available information. Furthermore, the load of the funds may be used to determine a portion of this amount.

Furthermore, once this information is received, the client's investment funds may be compared to the benchmarks to determine whether the fund is leading or lagging 150 the benchmark in performance. Since all fiduciaries and their 401k/403b investors care about at the end of the day was "how much did my account grow" and "did I beat the benchmark"? Instead of spending many hours researching returns, fiduciaries can use the systems and methods described herein to determine this information, which takes less than 3 minutes and they will instantly have a report of their funds over the 5+ statute of limitations period as well as a report consistent with the American Law Institute's recommended passive funds.

In this manner, mostly publicly available information may be used to quickly assess multiple periods and investments and provide much more information, in an easy to understand format. This may show a fiduciary that using the systems and methods described herein may provide them with more information than they currently have, and may allow them to correct lags more quickly.

Method 100 may also include providing information about the client investments 160. This may include the information provided in the report shown in FIG. 3, as well as other information. The information may include information about the laws a fiduciary needs to follow, as well as client investment performance relative to the investments' respective primary prospectus benchmarks, investment cost versus return cost, compliance with the law, etc.

Figure 4:
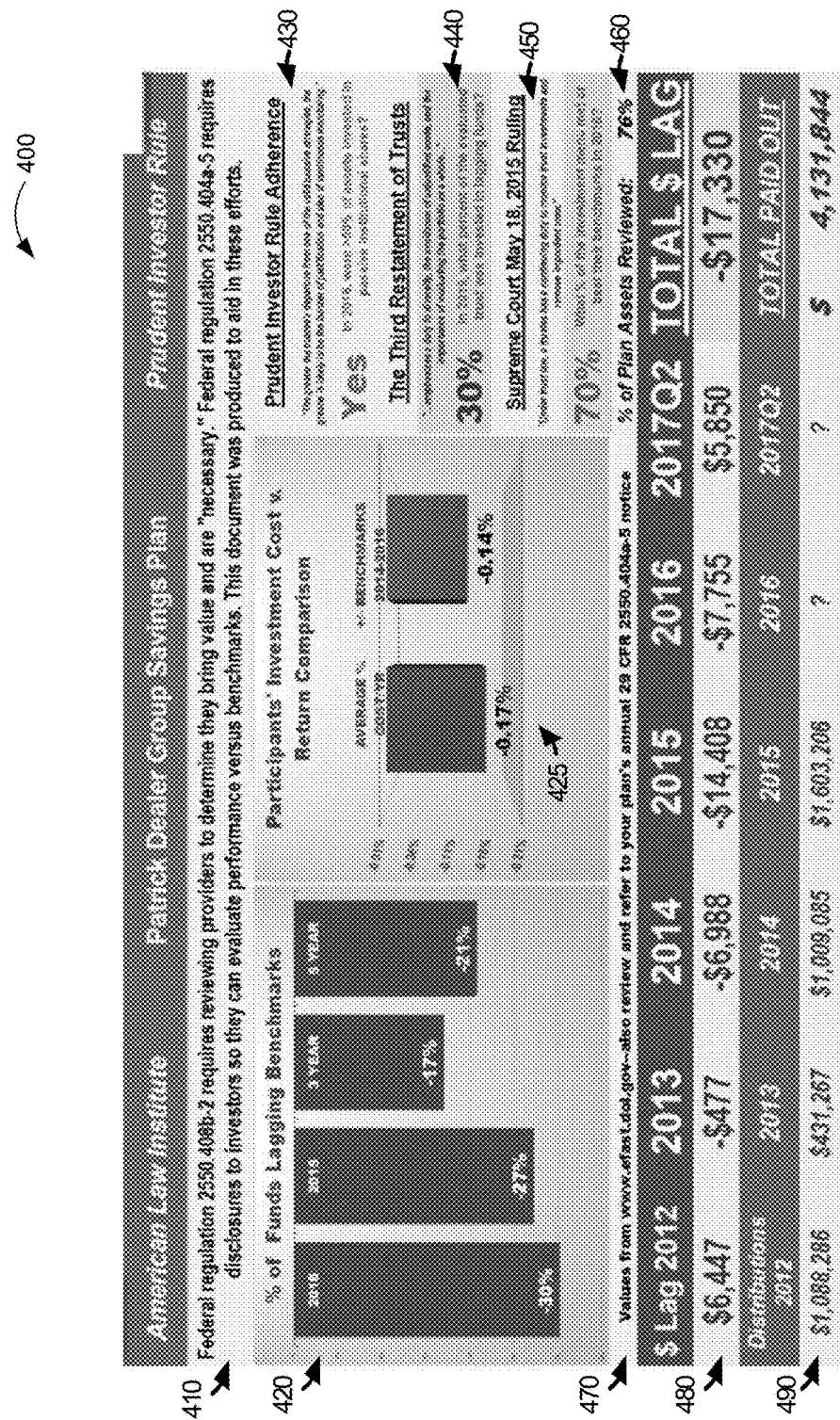
FIG. 4 is an example output/report generated by the systems and methods, according to an embodiment.

American Law Institute (ALI) currently has a list of about 400 funds that a prudent fiduciary can use for investing. Method 100 may include providing information about client investment performance if a random sampling of the ALI 400 funds were used 170. An example of this is shown in FIG. 4.

Method 100 may also include providing investment options 180 that would reduce the lag and ensure the fiduciary remains in compliance with the law. These investment options could include lower or no load options similar to those currently used by the client, or other investment options to reduce the lag and bring the fiduciary in compliance with the law.

It is estimated that 90% of trusts contain underperforming trust investments. The percent of assets in these low performing investments equals ~70%. This "impairment" or use of bad investments, leads to a lag behind benchmarks of 1% per annum. Example, a trust with $10 M in assets is leaking $70,000 each year (or more as the trust receives more contributions).

The current financial services industry may not prefer comparisons to benchmarks as required by ERISA and Uniform Prudent Investor Act (UPIA). Why? Benchmarks (i.e. Russell 1000) have no expenses and the expenses of index funds that mirror those benchmarks are very low (0.05% VFIAX Vanguard 500 Index). They prefer to compare to peers or other high fee mutual funds (cleanest of the dirty shirts in the laundry analogy).

Figure 2:
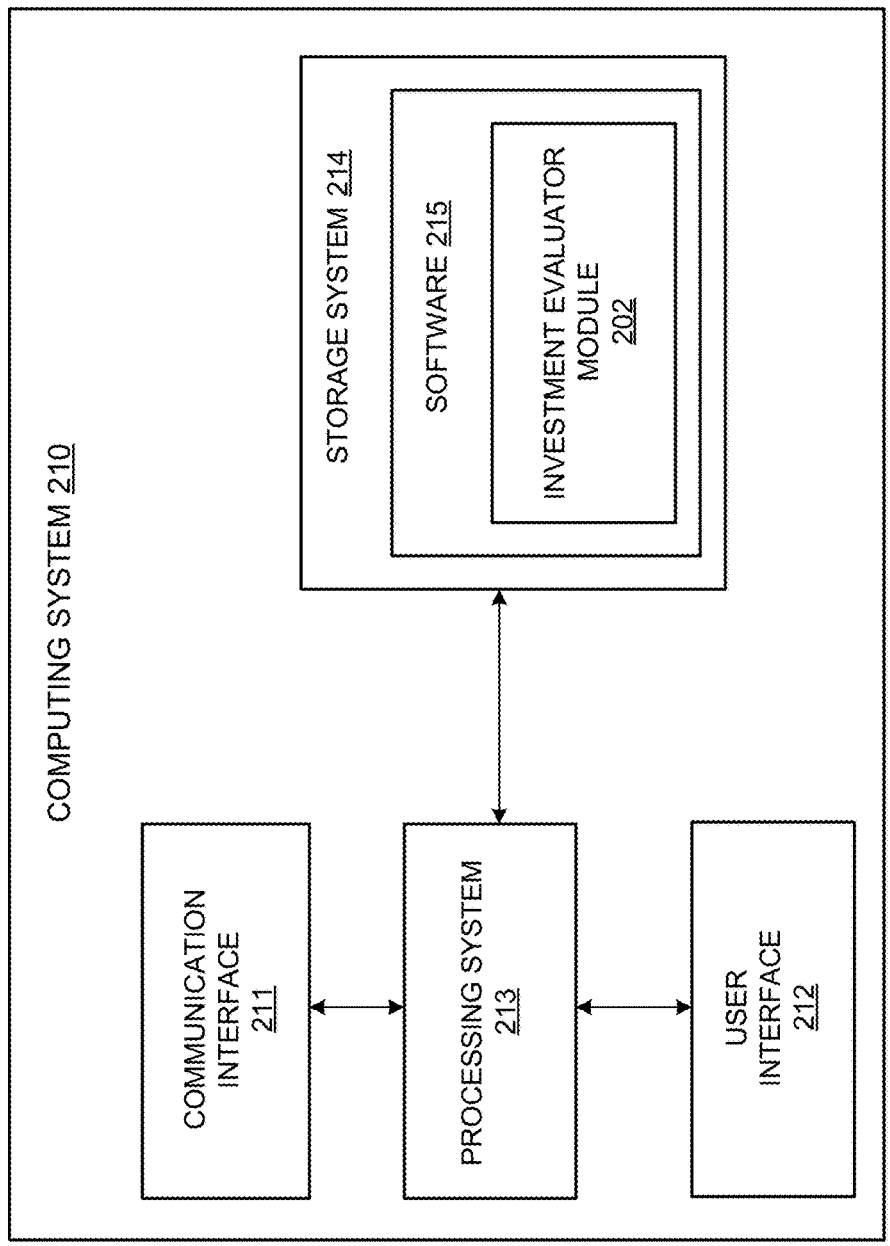
FIG. 2 shows an example computing system, according to an embodiment.

FIG. 2 illustrates a computing system 210 which is an exemplary system used to implement all or portions of an investment evaluator, according to the present disclosure. Investment evaluation system 210 is capable of receiving and processing client information and client investment information and providing information about the client's investments to reduce lag and reduce the risk of non-compliance with the law.

Investment evaluation system 210 includes communication interface 211, user interface 212, processing system 213, storage system 214, and software 215. Software 215 includes driver analysis module 202. Processing system 213 is linked to communication interface 211 and 212. Software 215 is stored on storage system 214. In operation, processing system 213 executes software 215, including investment evaluator module 202, to operate as described herein.

Communication interface 211 comprises a network card, network interface, port, or interface circuitry that allows storage system 214 to obtain client and client investment information. Communication interface 211 may also include a memory device, software, processing circuitry, or some other communication device.

User interface 212 comprises components that interact with a user to receive user inputs and to present media and/or information, such as outputs or reports. User interface 212 may include a speaker, microphone, buttons, lights, display screen, mouse, keyboard, or some other user input/output apparatus—including combinations thereof. User interface 212 may be omitted in some examples.

Processing system 213 may comprise a microprocessor and other circuitry that retrieves and executes software 215, including investment evaluator module 202, from storage system 214. Storage system 214 comprises a disk drive, flash drive, data storage circuitry, or some other memory apparatus. Processing system 213 is typically mounted on a circuit board that may also contain storage system 214 and portions of communication interface 211 and user interface 212.

Software 215 comprises computer programs, firmware, or some other form of machine-readable processing instructions. Software 215 may include an operating system, utilities, drivers, network interfaces, applications, virtual machines, or some other type of software, such as investment evaluator module 202. When executed by processing system 213, software 215 directs processing system 213 to accomplish some or all of the methods and system functionality described herein.

Systems, methods, and software disclosed herein may enable users to better comply with employment and tax law. Systems, methods, and software disclosed herein may also help ensure lagging investments can be identified and replaced by faster growing investments according to the American Law Institute (ALI), the leading independent organization in the United States producing scholarly work to clarify, modernize, and improve the law, using its Restatement of the Law Third, Trusts (which covers trust administration, particularly breaches of trust and the appropriate legal remedies). The analysis used by the systems, methods, and software disclosed herein may be unique in that it may use the party (trustees') own filings (Annual Reports of Employee Benefit Plans IRS 5500 publicly available information from efast.dol.gov). So this may eliminate false positives and inaccuracies since information used is the trustee fiduciary's and auditor's own work that each previously certified as correct.

Systems, methods, and software disclosed herein may be able to identify and provide to trustees, participants and auditors imprudent trust investments. Industry norms indicate it requires 40 to 50 hours per trust review by human resources or financial officers overseeing trusts for 401k plan participants for each available investment option. As of Jun. 30, 2017, the time necessary for trustees to review the universe of 28,547 potential replacement investments can cost employers even more time to be compliant with requirements:

Of business insurers (i.e., Travelers, Chubb, etc.);
Of the tax-exempt approval entity for trusts (IRS); and
Of the DOL responsible for protection of the participant/beneficiary.

Figure 3:
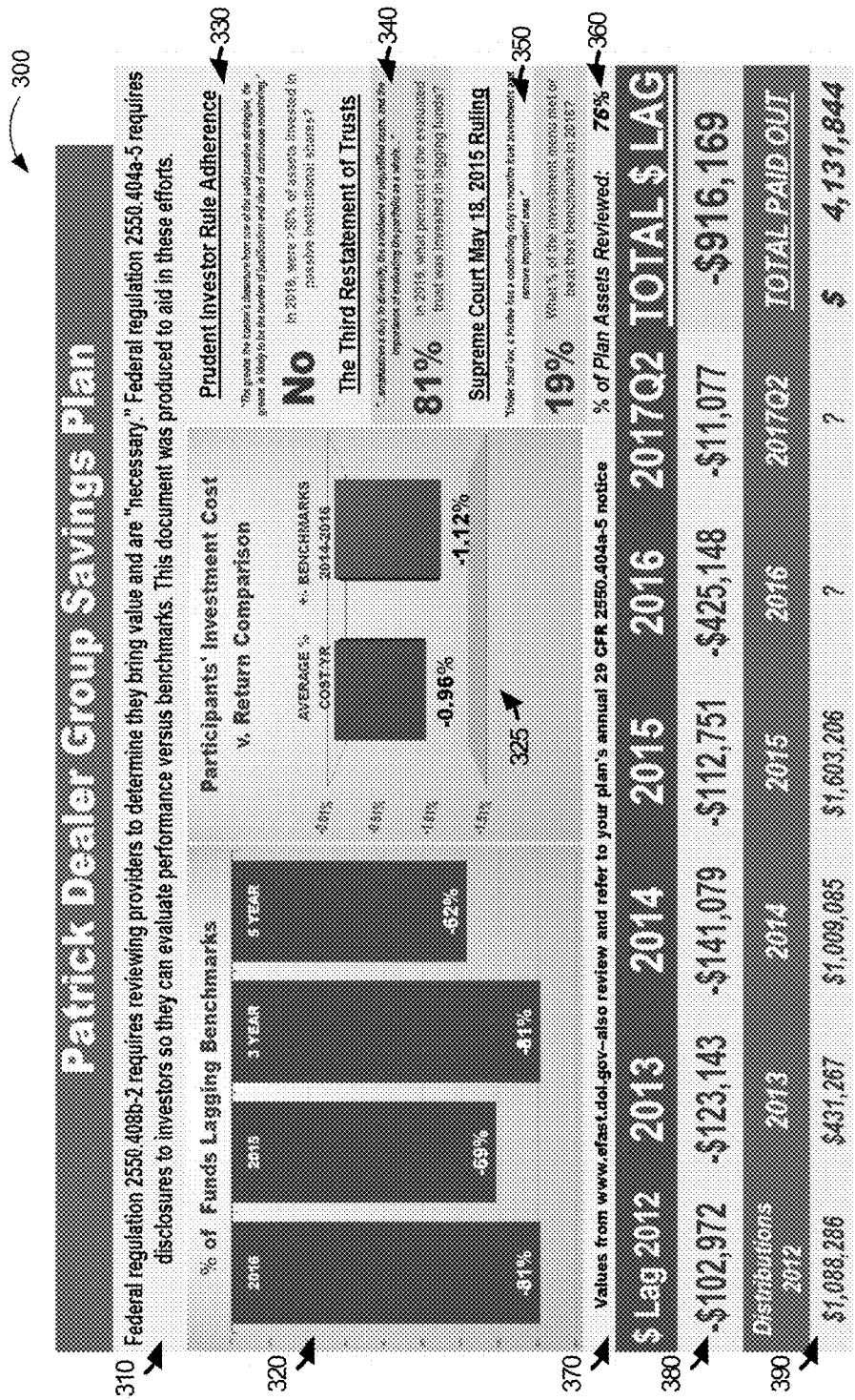
FIG. 3 is an example output/report generated by the systems and methods, according to an embodiment.

FIG. 3 is an example output report 300 from the methods and systems described herein. Report may include various information received and generated by the systems and methods of the disclosure 310-390. For this example the "Patrick Dealer Group" savings plan has been evaluated.

Output 300 may include Federal regulation portion 310, which includes the language "Federal regulation 2550.408b-2 requires reviewing providers to determine they bring value and are "necessary". Federal regulation 2550-404a-5 requires disclosures to investors so they can evaluate performance versus benchmarks. This document was produced to aid in these efforts". This portion 310 of the output may remind the fiduciary of a law requirement of their position as fiduciary of a ERISA compliant 401k/403b account.

ERISA, along with trust law, the foundation upon which ERISA was constructed, places paramount emphasis on the participant (beneficiary) and the role of the fiduciary (trustee) who oversees the Trust. Trust law is so protective that any and every dollar spent must be necessary. Regulation 408b-2 does not add responsibilities, but was implemented in acknowledgement of the challenges fiduciaries faced in obtaining the information needed to determine if services are necessary and fees are reasonable. What is universally missed is that funds that underperform their benchmarks as outlined in the 404a-5 notice, can indicate whether the services provided by investment advisors hired to recommend or select investments for the Plan are necessary by whether their investments outperform or lag their benchmarks.

The 404a-5 notice, however, only provides the returns of the funds and their benchmarks in percentage terms over annualized performance periods, there is no assessment of the actual loss imprudent investments cost the participants. Additionally, the benchmarks used in the 404a-5 notice, while useful, are not typically those chosen specifically by the fund companies themselves. The systems and methods of the present disclosure may provide the actual harm, or money lost, being done to participants in dollar terms both year-to-date and over the previous five calendar years.

Output 300 may also include a percentage of funds lagging benchmarks portion 320. This may be in the form of a bar chart that provides a historical assessment of the percentage of funds in the client's retirement plans that underperform their primary prospectus benchmark. This chart effectively illustrates the scope of the problem over the course for the previous five years to determine if the problem is relatively new or longstanding.

This portion 320 also shows the magnitude of the problem and the amount of dollars and/or percentages of the underperformance. In this example, it shows that 81% of funds in the client's investments lagged in year 2016.

Portion 325 is a Participants' Investment Cost v. Return Comparison. This may be in the form of a bar chart, which provides the average investment cost per year on a percentage basis (in this example –0.96%), as well as the amount of trust assets lost by investing in underperforming funds over a three-year period of time when compared to their benchmarks. In this example the client spent 0.96% for each year (2014, 2015 and 2016) for their investments but their three-year returns lag their respective benchmarks by an average of 1.12% per year.

Portion 330 may be a Prudent Investor Rule Adherence portion. Portion 330 may include language such as ""The greater the trustee's departure from one of the valid passive strategies, the greater is likely to be the burden of justification and also of continuous monitoring".

This language is from Section 227 of the Third Restatement of Trusts where the American Law Institute postulates that active fund management adds costs without necessarily a commensurate increase in value. In fact, research has shown that few actively managed funds can demonstrate long-term sustained added value that also could not be attributed to luck.

Because of the Trust relationship and the skill, time and labor required to assess if an actively managed fund is prudent fiduciaries of qualified retirement plans holding more than 50% of their portfolio in actively managed funds are adding undue burden to themselves and unwarranted risk to the plan's participants. In contrast, passively managed funds (index funds) replicate a broad market segment and, by definition, cannot be considered imprudent. In this example the fiduciary of the client's investments has not adhered to the prudent investor rule, and may be subject to fines and other punishment, including having to pay into the investments the amount of lag.

Output 300 may include a Third Restatement of Trusts/percentage of lagging funds portion 340. This may include the language " . . . emphasizes a duty to diversify, the avoidance of unjustified costs, and the importance of evaluating the portfolio as a whole".

The Prudent Investor Rule and Third Restatement of Trusts explicitly states one of the main focuses of this disclosure: the avoidance of unjustified costs. If actively managed funds rarely outperform their targeted benchmark over multiple years, then paying more to attempt to do so is an unjustified cost and a breach of the Prudent Investor Rule. The Prudent Investor Rule also requires that the portfolio must be evaluated as a whole. On this point, all commonly used monitoring tools may fail. While these tools assess each fund on a variety of points, only the methods and systems of the present disclosure assesses the portfolio as a whole by identifying the prudence of a portfolio through aggregated lag costs and adherence to the Prudent Investor Rule, The Third Restatement of Trusts, and court rulings. In this component, the percentage of the Plan's assets invested in lagging funds is clearly indicated. In this example, 81% of the funds used in the client's investments lagged their own stated benchmarks.

Output 300 may also include a Supreme Court/performing funds portion 350. This portion 350 may include language from a Supreme Court case, as well as percentage of client investment funds performing at or above the comparison index.

From the May 18, 2015 Supreme Court Ruling: "Under trust law, a trustee has a continuing duty to monitor trust investments and remove imprudent ones". The unanimous Supreme Court ruling simply asserts that it is a violation of trust law to allow imprudent funds to remain in a plan and continue lagging behind their benchmarks. This component clearly identifies the scope of the problem by clearly stating the percentage of investments that lag their benchmark. Portions 340 and 350 clearly show both the percentage of lagging funds, along with the percentage of affected assets.

Output 300 may also include a Percentage of Assets reviewed portion 360. Portion 360 may show the assets represented in the output 300. Because only audited Level 1 trust assets (mutual funds and other investments that have quoted prices in active, liquid and visible markets such as stock exchanges) are assessed by the methods, systems, and software of the present disclosure, assets held in Level 2, Level 3 and participant loans (Level 2 is observable information in active or inactive markets, such as two similarly situated buildings in a downtown real estate market; Level 3 are unobservable inputs to be used in situations where markets don't exist or are illiquid or where fair market valuation becomes highly subjective) are excluded from the evaluation. This component illustrates the percentage of Plan assets represented in the data.

Output 300 may also include a disclaimer portion 370. Disclaimer portion may include the language "Values from www.efast.dol.gov—also review and refer to your plan's annual 29 CFR 2550.404a-5 notice". At least some of the data received and inputted into the systems and methods may come from publicly available sources, such as the DOL/IRS Form 5500 found at the U.S. Labor Department's efast website. The systems and methods of the present disclosure may be effectively used in conjunction with the 404a-5 notice for the benefit of plan fiduciaries required to review the participant notification, as well as disclosing sufficient information to the plan participants should they so choose.

Output 300 may include a Dollar Lag Year to Date portion 380. The asset levels shown in portion 380 illustrates the actual loss (harm) the underperforming funds have caused to participants in dollar terms for the previous five calendar years through the most recent quarter-end year-to-date period. These totals are then aggregated to show a total dollar lag to account for the six-year statute of limitations referenced in prior court rulings. In this example, the funds have lagged $916,169 over the last 5+ years.

Output 300 may include a Current Year to Date Distributions portion 390. The asset levels shown in portion 390 illustrate the amount of plan assets distributed through participant departure. This rarely considered, but critical element shows the assets that cannot recover from the effect of the plan fiduciaries' imprudent fund selection and monitoring. Many investment advisors/consultants refer to a three- to five-year time horizon before funds are considered for removal in their investment policy statements. Imprudent funds, however, can have a devastating erosive effect on a portfolio over those longer time horizons through both actual losses and the compounding cost of continual relative underperformance.

The aforementioned Supreme Court ruling requiring the removal of imprudent investments is intended to protect participants against their portfolio-harming consequences. These amounts are received from the client's publicly available information. In this example, a total distribution paid out over the last 5+ years is $4,131,844.

FIG. 4 is an example output report 400 from the methods and systems described herein using random ALI 400 funds to show the difference to a fiduciary. Report may include various information received and generated by the systems and methods of the disclosure 310-390. For this example, the "Patrick Dealer Group" savings plan has been evaluated using random ALI 400 funds.

Output 400 may include Federal regulation portion 410, which is similar to the notice 310 of FIG. 3, which includes the language "Federal regulation 2550.408b-2 requires reviewing providers to determine whether they bring value and are "necessary". Federal regulation 2550-404a-5 requires disclosures to investors so they can evaluate performance versus benchmarks. This document was produced to aid in these efforts". This portion 310 of the output may remind the fiduciary of a law requirement of their position as fiduciary of a ERISA compliant 401k/403b account.

Output 300 may also include a percentage of funds lagging benchmarks portion 420. This may be in the form of a bar chart provides a historical assessment of the percentage of funds in the random ALI 400 funds that underperform their primary prospectus benchmark. This chart effectively illustrates the scope of the problem if the fiduciary had randomly selected ALI 400 funds instead of the funds actually used, over the course for each of year of the previous five years to determine if the problem is relatively new or longstanding.

This portion 320 also shows the magnitude of the problem and the amount of dollars and/or percentages of the underperformance. In this example, it shows that 30% (as opposed to the 81% in the actual client investments) of funds in the ALI 400 funds lagged in year 2016.

Portion 425 is a Participants' Investment Cost v. Return Comparison. This may be in the form of a bar chart, which provides the average investment cost per year on a percentage basis. In this ALI 400 example −0.17%. In the actual example −0.96%. This portion 425 also shows the amount of trust assets which would have been lost by investing in underperforming ALI 400 funds over a three-year period of time when compared to their benchmarks. In this example the ALI 400 investments investment cost lag the benchmarks by only 0.14% in contrast to the actual client investment loss of 1.12%.

Portion 430 may be a Prudent Investor Rule Adherence portion. Portion 430 may include language such as ""The greater the trustee's departure from one of the valid passive strategies, the greater is likely to be the burden of justification and also of continuous monitoring". It may also indicate if the fiduciary is adhering to the prudent investor rule. Here the indication is "Yes", instead of "No" for the actual client investment in FIG. 3.

This language is from Section 227 of the Third Restatement of Trusts where the American Law Institute postulates that active fund management adds costs without necessarily a commensurate increase in value. In fact, research has shown that few actively managed funds can demonstrate long-term sustained added value that also could not be attributed to luck.

Because of the Trust relationship and the skill, time and labor required to assess if an actively managed fund is prudent fiduciaries of qualified retirement plans holding more than 50% of their portfolio in actively managed funds are adding undue burden to themselves and unwarranted risk to the plan's participants. In contrast, passively managed funds (index funds) replicate a broad market segment and, by definition, cannot be considered imprudent. In this example the fiduciary of the client's investments has not adhered to the prudent investor rule, and may be subject to fines and other punishment, including having to pay into the investments the amount of lag.

Output 400 may include a Third Restatement of Trusts/percentage of ALI 400 lagging funds portion 440. This may include the language " . . . emphasizes a duty to diversify, the avoidance of unjustified costs, and the importance of evaluating the portfolio as a whole".

The Prudent Investor Rule and Third Restatement of Trusts explicitly states one of the main focuses of this disclosure: the avoidance of unjustified costs. If actively managed funds rarely outperform their targeted benchmark over multiple years, then paying more to attempt to do so is an unjustified cost and a breach of the Prudent Investor Rule. The Prudent Investor Rule also requires that the portfolio must be evaluated as a whole. On this point, all commonly used monitoring tools may fail. While these tools assess each fund on a variety of points, only the methods and systems of the present disclosure assesses the portfolio as a whole by identifying the prudence of a portfolio through aggregated lag costs and adherence to the Prudent Investor Rule, The Third Restatement of Trusts, and court rulings. In this component, the percentage of the Plan's assets invested in lagging funds is clearly indicated. In this example, 30% of the ALI 400 funds lagged compared to 81% of the funds used in the actual client's investments lagging their own sated benchmarks.

Output 400 may also include a Supreme Court/performing funds portion 450. This portion 450 may include language from a Supreme Court case, as well as percentage of client investment funds performing at or above the comparison index.

Portion 450 clearly shows both the percentage of leading funds, along with the percentage of affected assets. In the ALI 400 example 70% of the random ALI 400 funds are leading, as compared to 19% for the client's actual investments in FIG. 3.

Output 400 may also include a Percentage of Assets reviewed portion 460. Portion 360 may show the assets represented in the output 300. Because only audited Level 1 trust assets (mutual funds and other investments that have quoted prices in active, liquid and visible markets such as stock exchanges) are assessed by the methods and systems disclosed herein, assets held in alternative investments, such as Level 2, Level 3 and participant loans (Level 2 is observable information in active or inactive markets, such as two similarly situated buildings in a downtown real estate market; Level 3 are unobservable inputs to be used in situations where markets don't exist or are illiquid or where fair market valuation becomes highly subjective) are excluded from the evaluation. This component illustrates the percentage of Plan assets represented in the data. This is the same number as in FIG. 3 of the client's actual investments Output 400 may also include a disclaimer portion 470. This is the same disclaimer as in portion 370 of FIG. 3.

Output 400 may include a Dollar Lag Year to Date portion 480. The asset levels shown in portion 480 illustrates the actual loss (harm) the ALI 400 underperforming funds would have caused to participants in dollar terms for the previous five calendar years through the most recent quarter-end year-to-date period. These totals are then aggregated to show a total dollar lag to account for the six-year statute of limitations referenced in prior court rulings. In this example, using random ALI 400 funds would have produced a lag of $17,330, compared to the actual client funds having lagged $916,169 over the last 5+ years.

Output 400 may include a Current Year to Date Distributions portion 490. This is the same number as shown in FIG. 3. The aforementioned Supreme Court ruling requiring the removal of imprudent investments is intended to protect participants against their portfolio-harming consequences. These amounts are received from the client's publicly available information. In this example, a total distribution paid out over the last 5+ years is $4,131,844.

Mutual funds are the most commonly used investment in retirement plans in America. However fiduciaries who are personally liable for their employee investors in these mutual funds face incredible complexities and challenges in running these 401k/403b so they hire professionals, especially as plans have over 100 investors and an independent audit is required by the Internal Revenue Service (IRS). However, auditors are not investment licensed but instead are Certified Public Accountant (CPA) licensed and often do not know about or can identify payments like these two typical plans above showing their Annual Reports posted at www.efast.dol.gov. Public records show these plans cover about 500 investors or employees each and average wages of staff are much less per year than these two brokers were paid. Their investment brokers at these broker dealers made quite a bit more in one year.

Where does this money come from? The mutual funds "sold" by the broker to the fiduciaries of the plan on behalf of the employees' invested dollars.

Information was uncovered that is not very obvious to auditors and fiduciaries unless you analyze this closely over many decades and speak with independent auditors and fiduciaries of 401k/403b. Morningstar®, arguably the most respected mutual fund rating firm, ranks funds after 3 years of a fund's existence—1 star (bottom 10%) to 5 stars (top 10%) based on the fund's return ranking (adjusted for variability of returns or "risk-adjustment") versus similar funds or peers in that fund's category (i.e., large U.S. company, etc.). Many retirement plan fiduciaries, therefore, erroneously believe that 3 years is enough time to determine if a mutual fund manager is skilled, thereby generating "alpha". Alpha, often considered the active return on an investment, gauges the performance of an investment against a market index (benchmark), since they represent the market's movement as a whole. The excess returns of a fund relative to the return of a benchmark index are the fund's alpha.

It is not readily apparent or obvious to retirement plan fiduciaries that using statistics, a better measurement of skill finds it can take at least 10 times longer than the 3 years to be 95% confident that a fund manager can truly generate alpha. For example, after measuring every one of Fidelity's® funds (the largest and most commonly used active manager in retirement plans), the data shows that it would take 88 years (median) to statistically demonstrate that Fidelity's managers add value and therefore worth their additional cost. For example, Fidelity Blue Chip Growth's manager has managed the fund since Jul. 1, 2009 (8 years) and Morningstar® gives it the highest ranking of 5 stars. However, calculations show that it would take 129 years before an investor can be confident that the manager has sufficient skill to warrant the additional cost. This analysis corroborates S&P Dow Jones reporting on their SPIVA® U.S. Scorecard that >90% of fund managers lagged behind their benchmarks from 2002 to 2016. Conclusion: fees paid to almost all fund managers are wasted as managers cannot deliver on the value proposition they profess, which is to reliably outperform a risk comparable benchmark.

A regulated investment company (RIC) can be any one of several investment entities—for example, a mutual fund or exchange-traded fund (ETF), a real estate investment trust (REIT) or unit investment trust (UIT)—that is deemed eligible by the Internal Revenue Service (IRS) to pass through the taxes on capital gains. RICs are the foundational and predominant investment vehicles in 401k/403b. RICs get money by charging investors fees. Incentives are the cornerstone of modern life. By taking small amounts from gross asset values (GAV) every day from 100 million participants and the resulting net asset value (NAV) is posted to their 401k/403b website and statement. Example, a 1% fee on $92,500 (a recently reported average participant account balance) is $925. Deducted at one time, that is a noticeable amount of money. If, however, that charge is siphoned off each business day, the cost is $3.56, which attracts much less attention. When the fee is already taken from the daily reported value, it is altogether unseen.

Auditors and litigators fight over types of plan payments whether they are in violation of Restatement of Trust's unjustified costs by saying they either come directly from the RIC and not directly from the employee's mutual funds like SEC Rule 12b-1 fees. But what has been found is that no matter the type of fee whether it is deducted from the mutual fund company itself or directly from mutual fund investors themselves, over time all costs are born by investors by the company simply increasing its fund expense ratio.

For example, median mutual fund expense ratio rose from 1.05% at the end of March 2017 to 1.07% (2 basis point increase) at the end of June 2017. This was a relatively good return period for the stock market where most 401k/403b money is invested. So one would expect funds to lower fees when the S&P 500 rose by 3.09% or 309 basis points. But what was discovered is that EVERY expense shows up eventually in the Net Asset Value (NAV) posted at 4 pm every day the stock market is open. This price reflects every payment to every provider. And so in comparing the allocated dollars employees earn versus the index will capture and help explain the funds' lag behind benchmarks.

As is said in the investment world, when you can't beat the benchmark, simply buy it instead of doing what your professional broker tells you who is incentivized to keep fiduciaries and employees AWAY from benchmarks (because these "index" or passive funds have no manager fees, no marketing fees (12b-1), no sub-transfer agency fees, no finders fees, etc. etc. This is an especially compelling argument because brokers often say that buying an index fund guarantees a loss so buy actively managed funds to try and do better. As noted earlier, SPIVA discovered that >90% of actively managed funds lag their benchmarks over time so buying an index fund may in fact ensure relative outperformance.

So a way was developed via the systems and methods disclosed herein for fiduciaries to see the long term impact on their employees very quickly versus spending hundreds of hours searching for funds among the tens of thousands of actively managed funds when the couple of hundred index funds not paying anyone anything except their investors.

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

What is claimed is:

1. A method for evaluating investments, comprising:
receiving client identification information by a processor;
receiving client investment information, based at least in part on the received client identification information;
receiving client fund and benchmark information, based at least in part on the received client investment information;
determining manager fees, based at least in part on the received client investment information or the client fund information;
comparing the client fund and benchmark information;

calculating the received client fund lag, based at least in part on the comparison and the determined manager fees;

displaying, on a user interface, augmented information about the client investment information, wherein the augmented information comprises an indication of lagging and leading client funds, compliance with the one or more laws, or a dollar amount leading or lagging: over at least the past five years;

selecting an investment option that complies with one or more laws, based at least in part on augmented information that reduces risk or increases the value of the investment; and displaying updated augmented information based at least in part on the selected investment, wherein the updated augments information comprises an indication of compliance with the one or more laws, an indication of reduction risk, and increase value of the investment.

2. The method of claim 1, wherein client identification information comprises an employer identification number.

3. The method of claim 1, wherein the client investment information comprises annual report, income statement, balance sheet, or schedule of assets for the client's 401k/403b investments.

4. The method of claim 1, wherein the client fund and benchmark information is received from a paid service, the paid service comprising information on at least 20,000 different investments, comprising mutual funds most commonly used and accessible to retirement plans.

5. The method of claim 1, wherein calculating the received client fund lag further comprising using amounts added and subtracted from the client fund.

6. The method of claim 1, wherein the augmented information comprises an indication of the client's fund invested in alternative funds.

7. The method of claim 1, wherein providing investment options comprises providing specific investment options to comply with one or more laws, and to reduce lag increase the value of at least one of the client's investments.

8. The method of claim 1, wherein the displaying an indication of compliance with the one or more law comprises displaying compliance with a Department of Labor Rule.

9. The method of claim 1, wherein the displaying an indication of compliance with the one or more law comprises displaying compliance with an Employee Retirement Income Security Act Rule.

10. A non-transitory computer readable medium having stored thereon instruction, which if executed by a processor, cause the processor to:
receive client identification information by a processor;
receive client investment information, based at least in part on the received client identification information;
receive client fund and benchmark information, based at least in part on the received client investment information;
determine manager fees, based at least in part on the received client investment information or the client fund information;
compare the client fund and benchmark information;
calculate the received client fund lag, based at least in part on the comparison and the determined manager fees;
display, on a user interface, augmented information about the client investment information, wherein the augmented information comprises an indication of lagging and leading client funds, compliance with the one or more laws, or a dollar amount leading or lagging: over at least the past five years;
select an investment option that complies with one or more laws, based at least in part on augmented information that reduces risk or increases the value of the investment; and
display updated augmented information based at least in part on the selected investment, wherein the updated augments information comprises an indication of compliance with the one or more laws, an indication of reduction risk, and increase value of the investment.

11. The non-transitory computer readable medium of claim 10, wherein the client investment information comprises annual report, income statement, balance sheet, or schedule of assets for the client's 401k/403b investments.

12. The non-transitory computer readable medium of claim 10, wherein the client fund and benchmark information is received from a paid service, the paid service comprising information on at least 20,000 different investments, comprising mutual funds most commonly used and accessible to retirement plans.

13. The non-transitory computer readable medium of claim 10, wherein calculating the received client fund lag further comprising using amounts added and subtracted from the client fund.

14. A system for evaluating investments, comprising: a processor configured to:
receive client identification information by a processor;
receive client investment information, based at least in part on the received client identification information;
receive client fund and benchmark information, based at least in part on the received client investment information;
determine manager fees, based at least in part on the received client investment information or the client fund information;
compare the client fund and benchmark information;
calculate the received client fund lag, based at least in part on the comparison and the determined manager fees;
display, on a user interface, augmented information about the client investment information, wherein the augmented information comprises an indication of lagging and leading client funds, compliance with the one or more laws, or a dollar amount leading or lagging: over at least the past five years;
select an investment option that complies with one or more laws, based at least in part on augmented information that reduces risk or increases the value of the investment; and
display updated augmented information based at least in part on the selected investment, wherein the updated augments information comprises an indication of compliance with the one or more laws, an indication of reduction risk, and increase value of the investment.

15. The system of claim 14, wherein the displaying an indication of compliance with the one or more law comprises displaying compliance with Internal Revenue Code Section 4975.

16. The system of claim 14, wherein the client fund and benchmark information is received from a paid service, the paid service comprising information on at least 20,000 different investments, comprising mutual funds most commonly used and accessible to retirement plans.

17. The system of claim 14, wherein calculating the received client fund lag further comprising using amounts added and subtracted from the client fund.

18. A method for evaluating investments, comprising:
receiving client identification information by a processor;
receiving client investment information, based at least in part on the received client identification information;
receiving client fund and benchmark information, based at least in part on the received client investment information;
determining manager fees, based at least in part on the received client investment information or the client fund information;
comparing the client fund and benchmark information;
calculating the received client fund lag, based at least in part on the comparison and the determined manager fees;
displaying, on a user interface, augmented information about the client investment information, wherein the augmented information comprises an indication of lagging and leading client funds, compliance with the one or more laws, or a dollar amount leading or lagging: over at least the past five years;
selecting an investment option that complies with one or more laws, based at least in part on augmented information that reduces risk or increases the value of the investment; and
displaying updated augmented information based at least in part on the selected investment, wherein the updated augments information comprises an indication of compliance with the one or more laws, an indication of reduction risk, and increase value of the investment,
wherein calculating the received client fund lag further comprising using amounts added and subtracted from the client fund.

19. The method of claim 18, wherein the calculating the received client fund lag and providing investment options are accomplished with thirty minutes.

20. The method of claim 18, wherein the providing investment options comprises comparing the received client fund to at least 20,000 different investments, comprising mutual funds most commonly used and accessible to retirement plans.

21. The method of claim 18, wherein the displaying an indication of compliance with the one or more law comprises displaying compliance with Internal Revenue Code Section 4975.

22. A non-transient computer readable medium having stored thereon instruction for evaluating investments within 30 minutes to reduce risk of breaking a law, to reduce lag of investments, displaying compliance with at least one law, or displaying the lag of investments, which if executed by a processor, cause the processor to:
receive client identification information by a processor;
receive client investment information, based at least in part on the received client identification information;
receive client fund and benchmark information, based at least in part on the received client investment information;
determine manager fees, based at least in part on the received client investment information or the client fund information;
compare the client fund and benchmark information;
calculate the received client fund lag, based at least in part on the comparison and the determined manager fees;
display, on a user interface, augmented information about the client investment information, wherein the augmented information comprises an indication of lagging and leading client funds, compliance with the one or more laws, or a dollar amount leading or lagging: over at least the past five years;
select an investment option that complies with one or more laws, based at least in part on augmented information that reduces risk and increases the value of the investment; and
display updated augmented information based at least in part on the selected investment, wherein the updated augments information comprises an indication of compliance with the one or more laws, an indication of reduction risk, and increase value of the investment.

* * * * *